(12) United States Patent
Duffy et al.

(10) Patent No.: US 8,806,426 B2
(45) Date of Patent: Aug. 12, 2014

(54) CONFIGURABLE PARTITIONING OF PARALLEL DATA FOR PARALLEL PROCESSING

(75) Inventors: Joe Duffy, Renton, WA (US); Igor Ostrovsky, Bellevue, WA (US); Huseyin Yildiz, Kenmore, WA (US); Stephen Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1459 days.

(21) Appl. No.: 12/132,613

(22) Filed: Jun. 4, 2008

(65) Prior Publication Data

US 2009/0319992 A1 Dec. 24, 2009

(51) Int. Cl.
G06F 9/44 (2006.01)

(52) U.S. Cl.
CPC .................................. *G06F 8/00* (2013.01)
USPC ........................... 717/106; 717/107; 717/120

(58) Field of Classification Search
None
See application file for complete search history.

(56) References Cited

U.S. PATENT DOCUMENTS

| | | | |
|---|---|---|---|
| 5,224,056 A | 6/1993 | Chene et al. | |
| 5,790,852 A | 8/1998 | Salm | |
| 6,336,134 B1 | 1/2002 | Varma | |
| 6,408,292 B1 * | 6/2002 | Bakalash et al. | 707/999.002 |
| 6,480,816 B1 | 11/2002 | Dhar | |
| 7,002,571 B2 | 2/2006 | Lake et al. | |
| 7,065,576 B2 | 6/2006 | Kamel et al. | |
| 7,203,696 B2 | 4/2007 | Atm | |
| 7,246,345 B1 * | 7/2007 | Sharma et al. | 717/120 |
| 7,356,672 B2 | 4/2008 | Vahid et al. | |
| 2005/0198469 A1 | 9/2005 | Mitchell | |
| 2006/0020594 A1 | 1/2006 | Garg et al. | |
| 2007/0179927 A1 | 8/2007 | Vaidyanathan et al. | |
| 2007/0271562 A1 | 11/2007 | Schumacher et al. | |

FOREIGN PATENT DOCUMENTS

CN 101002170 A 7/2007

OTHER PUBLICATIONS

Bourdoncle, "Abstract Interpretation by Dynamic Partitioning", Journal of Functional Programming, Date: Mar. 1992, 42 Pages.
"Chunk Partitioning Vs Range Partitioning in PLINQ", http://blogs.msdn.com/pfxteam/archive/2007/12/02/6558579.aspx.
Diniz, et al., "Parallel Algorithms for Dynamically Partitioning Unstructured Grids", Proc. 7th SIAM Conference on Parallel Processing }or Scientific Computing, San Francisco, CA, 1995,pp. 615-620.
Stitt, et al., "Dynamic Hardware/Software Partitioning: A First Approach", Proceedings of the 40th conference on Design automation, University of California, Date: Jun. 2-6, 2003, pp. 250-255, ACM Press, New York, USA.
"Supplemental European Search Report", May 24, 2012, pp. 8.
F. Buschmann et al., "Pattern-Oriented Software Architecture: A System of Patterns", Oct. 1996, pp. 245-263.
H. Conrad Cunningham et al., "Using the Divide and Conquer Strategy to Teach Java Framework Design", Proceedings PPPJ, pp. 40-45.

(Continued)

*Primary Examiner* — Qamrun Nahar
(74) *Attorney, Agent, or Firm* — Kevin Sullivan; Kate Drakos; Micky Minhas

(57) ABSTRACT

A data partitioning interface provides procedure headings to create data partitions for processing data elements in parallel, and for obtaining data elements to process, without specifying the organizational structure of a data partitioning. A data partitioning implementation associated with the data partitioning interface provides operations to implement the interface procedures, and may also provide dynamic partitioning to facilitate load balancing.

20 Claims, 4 Drawing Sheets

(56) References Cited

OTHER PUBLICATIONS

Gamma E. et al., "Design Patterns, Passage", Jan. 1, 1996, pp. 14-18, 207-217, 315-330.
International Search Report and Written Opinion, PCT/US2009/042619, Nov. 23, 2009.
Yin Jiuyang, Fang Bingxing, Zhang Hongli, "Study of Parallel Software Module Design Based on Performance Predict", School of Computer Science and Technology, Harbin Institute of Technology, Harbin 150001, Oct. 20, 2004, 4 pages (English language portions and images), Abstract only.
WangXue-de, et al., "A Parallel Algorithm of 3D Unstructured DSMC Method and Its Application", Journal of Astronautics, vol. 28 No. 6, Nov. 2007, 8 pages (English Language portions and images), Abstract only.
"Final Rejection in China Patent Application No. 200980121350.0", Mailed Date: Sep. 30, 2013, Filed Date: May 1, 2009, 11 Pages.

* cited by examiner

CONFIGURABLE PARTITIONING OF PARALLEL DATA FOR PARALLEL PROCESSING

BACKGROUND

Control parallelism finds support in multithreaded environments and multiprocessing environments. Control parallelism in a programming model relates to support for executing two or more instruction sequences in parallel. A multithreaded environment, for example, supports control parallelism by supporting execution of two or more threads in parallel, or by at least allowing a developer to structure software in a way that facilitates parallel execution of thread instruction sequences if multiple processor cores are available.

Data parallelism in a programming model relates to support for processing two or more portions of a data set in parallel. Data parallelism therefore involves some form of control parallelism in the instructions that process the data. However, control parallelism does not necessarily involve any data parallelism; each thread might operate only on its own internal variables, for example, instead of operating on some portion of an underlying shared data set. Some forms of data parallelism occur at a low level within computer hardware, as when a graphics processor operates on four pixels at a time, for example. Other forms of data parallelism have been pursued at higher levels, such as dividing an array of elements into subsets which are processed in parallel.

SUMMARY

In some embodiments, a data partitioning interface supports partitioning of parallel data. A data partitioning implementation is associated with the data partitioning interface. The data partitioning has an organizational structure which is unspecified in the data partitioning interface but is specific in the data partitioning implementation. Partitioning may be by chunks, stripes, ranges, or another organizational structure, for example. Some embodiments provide operations to create a data partitioning and to obtain a data element from a data partition. Some support dynamic partitioning to facilitate load balancing.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
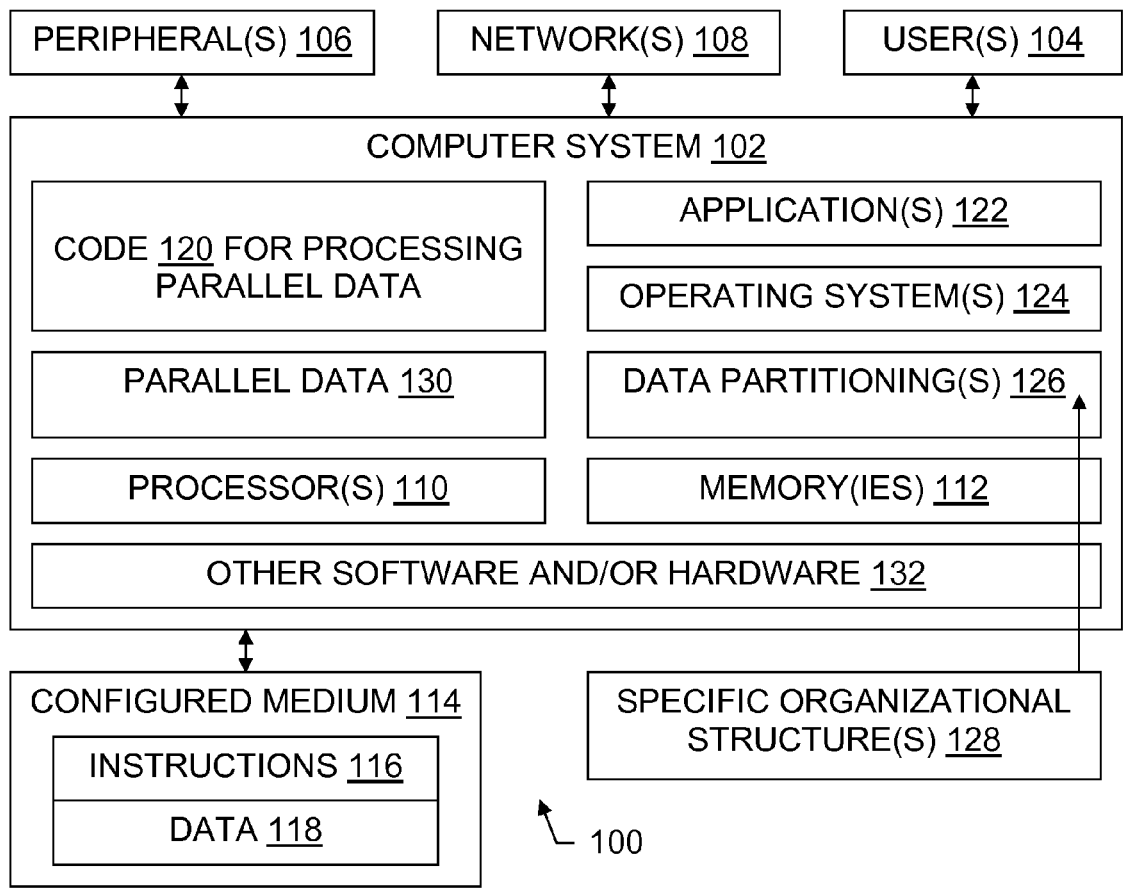
FIG. 1 is a block diagram illustrating a computer system in an operating environment, and configured storage medium embodiments.

Many approaches to data parallelism rely on data partitioning as the primary or sole mechanism for achieving parallelism. Yet there are a myriad of approaches to partition a particular data structure. While general approaches for partitioning data are possible, the optimal partitioning technique for a particular data structure that will be used in a particular way can be very dependent on the algorithms and data structures involved.

For example, if a data structure supports random access, it could be the case that one can divide its contents at a coarse granularity and rely on indexers that provide O(1) access to the data, that is, constant-time access to retrieve elements. This division of data can be very efficient for arrays and for data structures such as Microsoft® .NET™ Framework IList<T>s (marks of Microsoft Corporation), and can even partition data in a way that improves spatial locality. Alternately, it could be the case that the indexers are not really O(1) and a more efficient data access method exists. For example, consider a tree that implements a list interface but for each access requires an O(log n) traversal to locate the desired node. Given this traversal cost, an alternative access method may be sought.

For non-linear data structures like trees and XML documents, doing an initial breadth-wise partitioning of the tree may result in better access time and less overhead. Coarse division may result in more working set pages. For dense data structures full of pointers, locality may not present as large a benefit, so one may wish to use a more fine grained approach to dividing up the elements within the data structure.

Some problems may benefit from a very specific data-blocking structure. For example, Gaussian elimination and JPEG decoding require access to specific portions of the input at a time. This requirement changes the way in which locality impacts the performance of the algorithm, and may require an algorithm-specific data partitioning technique.

A worst case scenario may be a data structure which lacks support for random access, in a context where a general purpose processing framework would need to use a single, linear enumerator to which access is synchronized. This applies to any Microsoft® .NET™ Framework IEnumerable<T>, for example, and severely limits scalability.

Regardless of specific strategies, better algorithms may be developed over time, and one may wish to allow them to be plugged into the processing framework and used to drive partitioning.

Accordingly, it may be helpful to make partitioning a customizable part of a data parallelism system. Some embodiments discussed here provide a particular but deeply-ingrained support for pluggable partitioning algorithms. Some embodiments also provide specific capabilities in interfaces that enable pluggable partitioning, such as procedures to determine whether data elements can be accessed by ordinal position, procedures to supply hints for assisting data partitioning, and procedures for tracking execution suspensions to facilitate better dynamic partitioning of parallel data, for example.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, "parallel data" is data which is susceptible to data parallelism. A parallel data set accordingly involves multiple data elements which can be processed in parallel. In a given configuration, for example, data structures such as arrays, trees, or lists may include parallel data. Programs often contain individual pieces of non-parallel data, that is, data which are generally not susceptible to data parallelism. A string containing a filename of a single file that is being viewed in a word processor would be an example. The term "data" herein includes both parallel data and non-parallel data unless otherwise indicated.

A "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

As used herein, terms referring to data structures are only as specific as their express qualifiers. For example, without further qualification, the term "list" includes both linked lists and lists implemented using an array.

Whenever reference is made to a data partitioning or other data structure, it is understood that the data structure configures a computer-readable memory, as opposed to simply existing on paper, in a programmer's mind, or as a transitory signal on a wire, for example.

Operating Environments

With reference to FIG. 1, an operating environment 100 for an embodiment may include, for instance, a computer system 102, which may be multithreaded or not, and multiprocessor or not. Human users 104 may interact with the computer system 102 or with another computer system in an embodiment by using screens, keyboards, and other peripherals 106. Storage devices and/or networking devices may be considered peripheral equipment in some embodiments. Other computer systems (not shown), which may themselves be multithreaded or not, and multiprocessing or not, may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system 102 when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110. The medium 114 is also configured with data 118 which is created, modified, referenced, and/or otherwise used by execution of the instructions 116. Instructions and data form part of code 120 designed for processing parallel data. Code 120 may be invoked by applications 122 and/or by operating systems 124, for example. The data 118 may include data structures containing parallel data 130, some of which may be organized by data partitionings 126, each of which has a specific organizational structure 128.

The instructions 116 and the data 118 configure the memory 112/medium 114 in which they reside; when that memory is a functional part of a given computer system, the instructions 116 and data 118 also configure that computer system. For clarity of illustration, memories 112 are shown in a single block in FIG. 1, but it will be understood that memories may be of different physical types, and that code 120, parallel data 130 and other data 118, applications 122, and other items shown in the Figures may reside partially or entirely within one or more memories 112, thereby configuring those memories.

In a given operating environment, the computer system 102 or another computer system may run one or more applications 122, may run an operating system 124, and may use any network interface equipment, now known or hereafter formed. In particular, applications 122 may be embedded. Parallel data 130 may be present, or may be awaiting retrieval from another location. Other software and/or hardware 132 not expressly named above may also be present in a given configuration.

An operating environment may include one or more multithreaded computer systems or non-multithreaded computer systems. These computer systems may be clustered, client-server networked, and/or peer-to-peer networked. Some operating environments include a stand-alone (non-networked) computer system.

Some of the suitable operating environments for some embodiments include the Microsoft® .NET™ environment (marks of Microsoft Corporation). In particular, some operating environments are expected to include software presently known as Parallel Extensions (PFX) to the .NET Framework for covering data parallel components such as Parallel LINQ (PLINQ) or Task Parallel Library (TPL), to allow custom partitioning providers to be included in Parallel Extensions itself for common data types, in the .NET Framework (e.g. for other data types like XML documents), and in end-developer code. Some suitable operating environments include Java® environments (mark of Sun Microsystems, Inc.), and some include environments which utilize languages such as C++ or C-Sharp.

Systems

Referring now to FIGS. 1 through 5, some embodiments include a computer system configured with a data partitioning interface 202 and a data partitioning implementation 204. These components are discussed in greater detail below.

Some embodiments include a configured computer-readable storage medium 114, which is an example of a memory 112. Memory 112 may include disks (magnetic, optical, or otherwise), RAM, EEPROMS or other ROMs, and/or other configurable memory. A general-purpose memory 112, which may be removable or not, and may be volatile or not, can be configured into an embodiment using components such as a data partitioning interface 202 and a data partitioning implementation 204, in the form of corresponding data 118 and instructions 116, read from a removable medium 114 and/or another source such as a network connection, to thereby form a configured medium in the form of configured memory 112 which is capable of causing a computer system to perform data partitioning method steps and provide data partitioning capabilities in a type-agnostic manner as disclosed herein. FIGS. 1 through 5 thus help illustrate configured storage media embodiments and method embodiments, as well as system embodiments.

In some embodiments, peripheral equipment such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Figure 2:
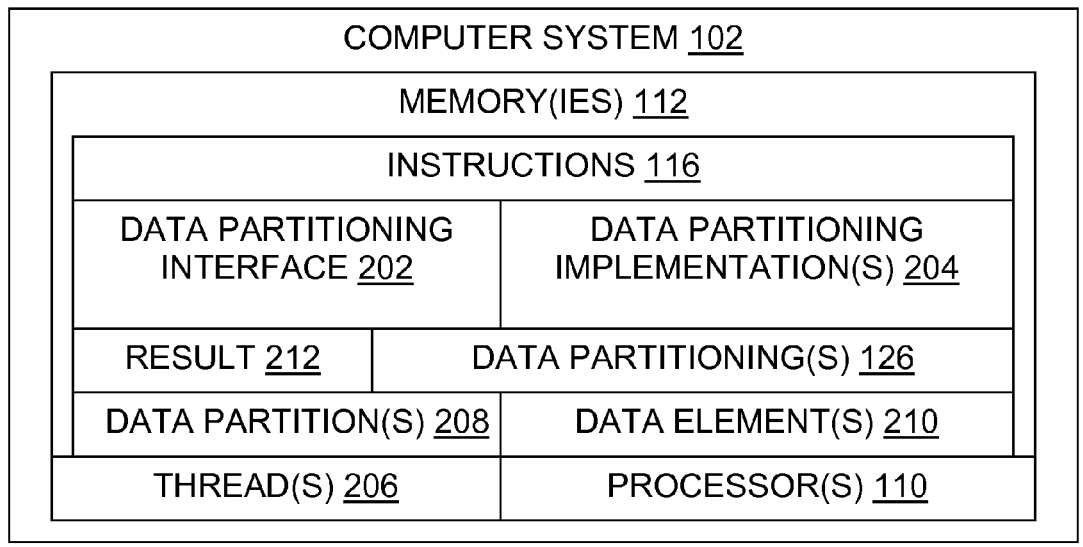
FIG. 2 is a block diagram further illustrating a computer system configured with a data partitioning interface, at least one data partitioning implementation, and at least one data partitioning.

As illustrated in FIG. 2, a computer system 102 may be configured with a data partitioning interface 202 and a data partitioning implementation 204. Also present in the illustrated configuration are data partitions 208 containing data elements 210. The data partitions 208 are defined in a data partitioning 126. A data partitioning 126 may be viewed as a collection of data partitions 208, as a scheme for producing a collection of data partitions 208, or both, depending on whether the context is best served by a structural view or a procedural view. Threads 206 can use routines in the data partitioning implementation to attempt to access individual data elements 210 of a given data partition 208. A result 212 returned by an access attempt may include a data element 210, a status code, or both.

Figure 3:
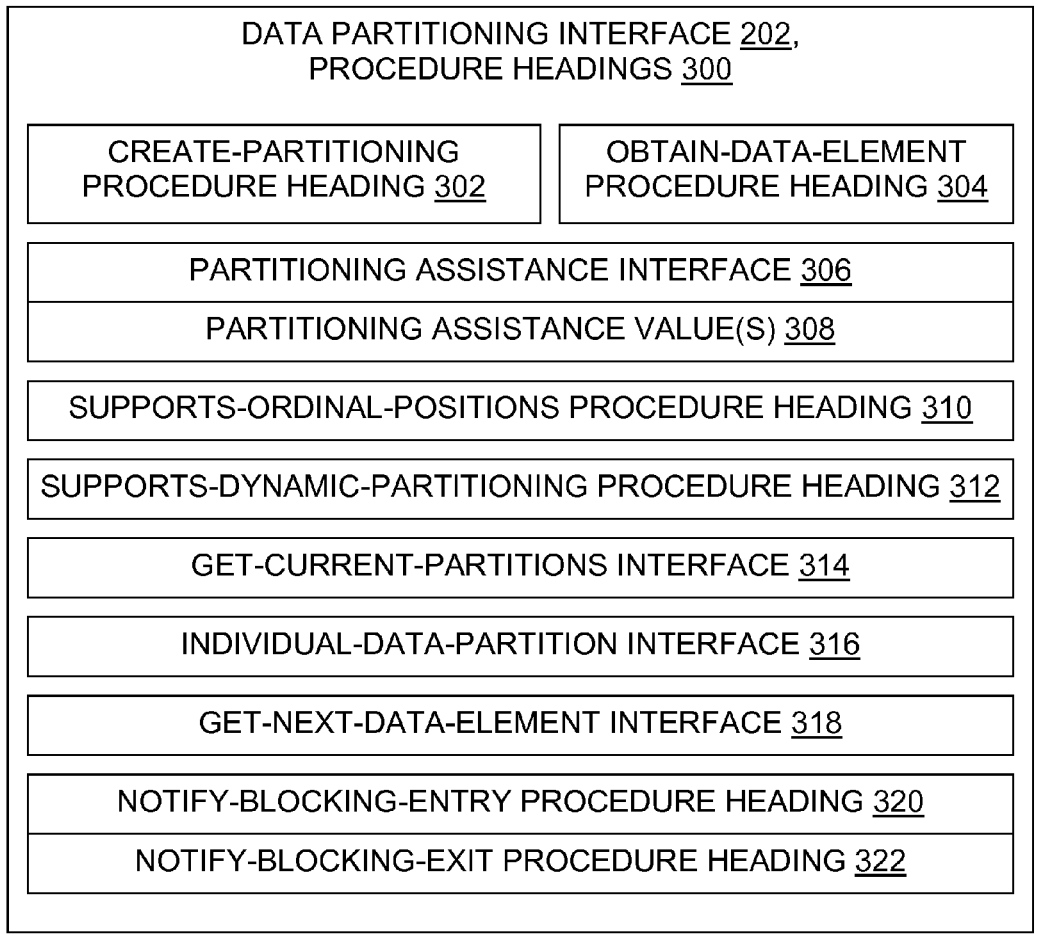
FIG. 3 is a block diagram further illustrating a data partitioning interface.

As illustrated in FIG. 3, some embodiments of a data partitioning interface include one or more "procedure headings". Procedure headings may be implemented as method signatures, type signatures, procedure specifications, method declarations, or the like. Procedure headings provide information such as the name of a function or other software routine, the parameters expected by the routine, and the value if any returned by the routine.

FIG. 3 shows several possible procedure headings 300 for a data partitioning interface 202. A create-partitioning procedure heading 302 defines an interface to one or more routines which attempt to create a data partitioning 126 in which data elements 210 are assigned to data partitions 208. An obtain-data-element procedure heading 304 defines an interface to one or more routines which attempt to remove a data element 210 from a data partition 208 for processing. A supports-ordinal-positions procedure heading 310 defines an interface to one or more routines which attempt to provide a result indicating whether individual data elements 210 can be accessed by identifying their respective ordinal positions within a data set. A supports-dynamic-partitioning procedure heading 312 defines an interface to one or more routines which attempt to provide a result indicating whether a given data partitioning 126 supports adding and/or removing data partitions 208, and/or moving data elements 210 between data partitions 208 after an initial assignment of data elements 210 to data partitions 208. A notify-blocking-entry procedure heading 320 and a matching notify-blocking-exit procedure heading 322 define an interface to one or more routines which attempt to provide the execution status (blocked/unblocked) of a worker thread 206 in code 120 for processing parallel data 130.

FIG. 3 also shows several interfaces within the data partitioning interface 202. A partitioning assistance interface 306, which may include or transmit partitioning assistance values 308, attempts to provide hints or guidelines for use in creating a data partitioning 126. A get-current-partitions interface 314 attempts to provide a current data partitioning 126. An individual-data-partition interface 316 attempts to provide access to a data partition 208 in a data partitioning 126. A get-nextdata-element interface 318 attempts to obtain a data element from a data partition of a data partitioning and update a state variable which is used to traverse the data elements to get each data element in turn.

Any or all of the interfaces 306, 314, 316, 318 may contain procedure headings 300. In fact, a given embodiment of an interface 306, 314, 316, 318 may include variables and/or one or more procedure headings. Likewise, variables may be used in addition to, or in place of, procedure headings 302, 304, 310, 312, 320, 322 in some embodiments. However, in a language such as C-Sharp or Java, keeping the data partitioning interface 202 free of assumptions about any specific data partitioning organizational structure 128 may be accomplished most easily in some cases by using procedure headings rather than using other approaches.

Figure 4:
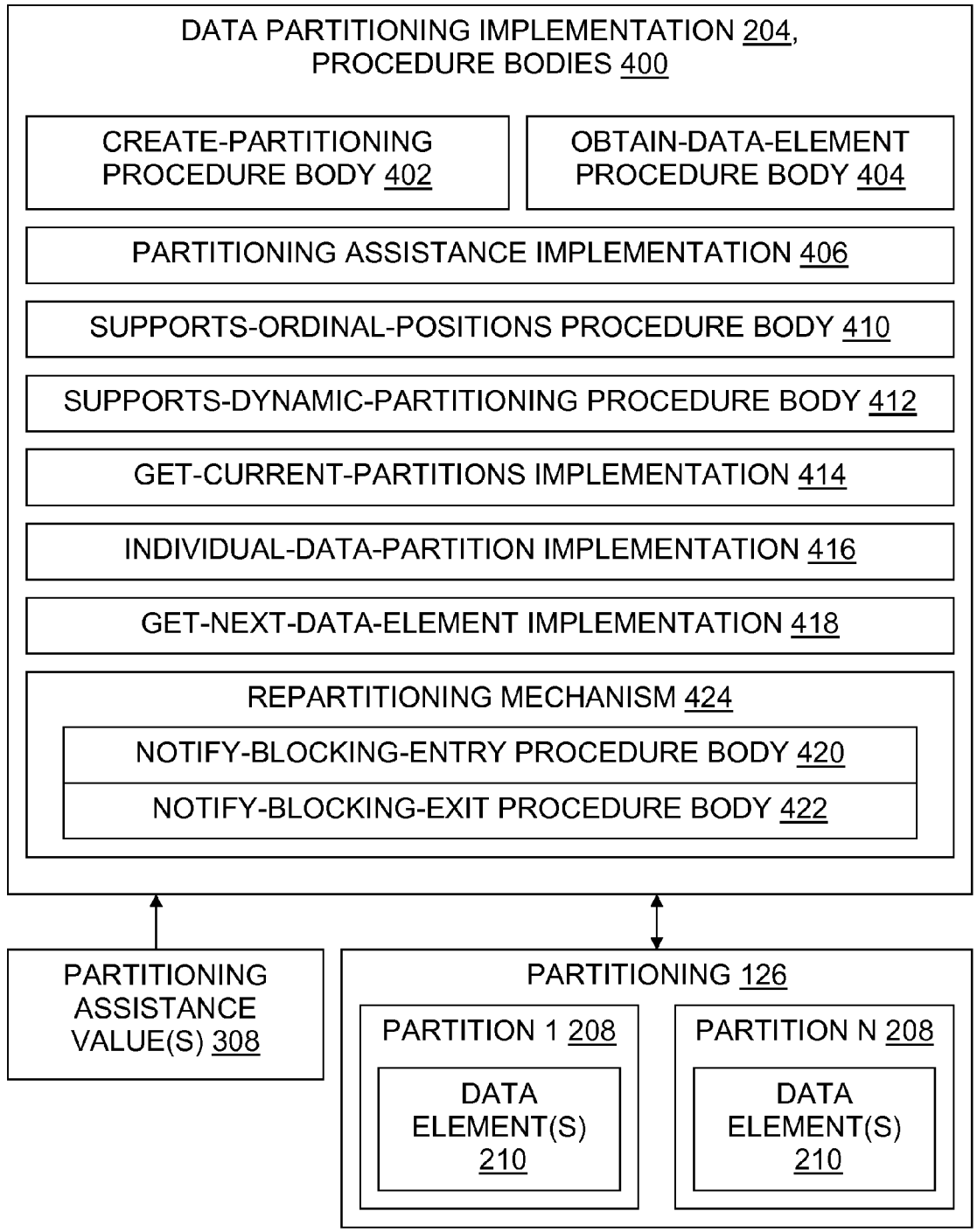
FIG. 4 is a block diagram further illustrating a data partitioning implementation.

FIG. 4 shows some of the possible procedure bodies 400 of a data partitioning implementation 204 which implement operations presented in the data partitioning interface 202. A given data partitioning interface 202 may have more than one corresponding data partitioning implementation 204, because the organizational structures 128 of data partitionings 126 are unspecified in the data partitioning interface 202 but specific in the routines of a data partitioning implementation 204. A create-partitioning procedure body 402 implements a routine which attempts to create a data partitioning 126 in which data elements 210 are assigned to data partitions 208. An obtain-data-element procedure body 404 implements a routine which attempts to remove a data element 210 from a data partition 208 for processing. A supports-ordinal-positions procedure body 410 implements a routine which attempts to provide a result indicating whether individual data elements 210 can be accessed by identifying their respective ordinal positions within a data set. A supports-dynamic-partitioning procedure body 412 implements a routine which attempts to provide a result indicating whether a given data partitioning 126 supports adding data partitions 208 and/or moving data elements 210 between data partitions 208 after an initial assignment of data elements 210 to data partitions 208. A notify-blocking-entry procedure body 420 and a matching notify-blocking-exit procedure body 422 implement routines which attempt to provide the execution status (blocked/unblocked) of a worker thread 206 in code 120 for processing parallel data 130.

The notify-blocking procedure bodies 420, 422 collectively are an example of a repartitioning mechanism 424 by which an allowing thread 206 can grant other threads permission to process data elements 210 that were previously assigned to the allowing thread. Such permission might be granted when the allowing thread is about to block, e.g., on an I/O call, or when the allowing thread is about to be terminated.

FIG. 4 also shows several interface implementations within the data partitioning implementation 204. A partitioning assistance implementation 406 attempts to provide hints or guidelines for use in creating a data partitioning 126. A get-current-partitions implementation 414 attempts to provide a current data partitioning 126. An individual-data-partition implementation 416 attempts to provide access to a data partition 208 in a data partitioning 126. A get-next-data-element implementation 318 attempts to obtain a data element from a data partition of a data partitioning and if successful updates a state variable which is used to traverse the data elements to get each data element in turn.

Figure 5:
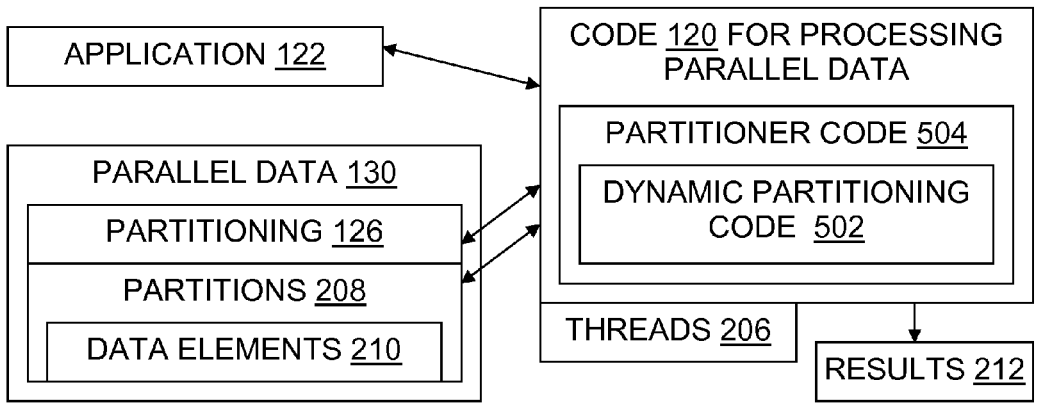
FIG. 5 is a block diagram illustrating a configuration with an application, code for processing parallel data, parallel data for partitioning, and processing results.

FIG. 5 shows a configuration with an application 122, code 120 for processing parallel data, parallel data 130 for partitioning, and processing results 212. In one embodiment, the code 120 includes a parallel processing library, such as one of the Microsoft Parallel Extensions for .NET parallel processing support libraries, e.g., the Microsoft Parallel LINQ (PLINQ) library or Task Parallel Library (TPL), suitably modified as taught herein. In the illustrated configuration, the code 120 for processing parallel data includes dynamic partitioning code 502, but it will be understood that not every embodiment supports dynamic partitioning. Dynamic partitioning code is one type of partitioner code 504; other types of partitioner code 504 can create a data partitioning but do so without supporting dynamic partitioning.

In some embodiments, the parallel processing code 120 asks the application 122 for data partitions 208, then processes the data 130 provided by the application, thereby producing computational results 212. Although FIG. 5 expressly shows results 212 returned by parallel processing code 120, it will be appreciated that other software, not least of all the application 122, also generally produces computational results. Indeed, the results 212 returned by the parallel processing code 120 may be passed to a routine in the application 122, which passes that result 212 (or another result based on that result 212) to another part of the application 120, thereby making results part of the application 122.

In some cases, the application 122 fully specifies to the code 120 the data partitioning 126 to be used. In some cases, the application 122 partially specifies to the code 120 the data partitioning 126 to be used, by providing the code 120 with partitioning assistance values 308. In some cases, the application 122 provides neither a full partitioning nor partitioning assistance values, and the details of the data partitioning 126 to use are left entirely to the code 120.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Methods Overview

Figure 6:
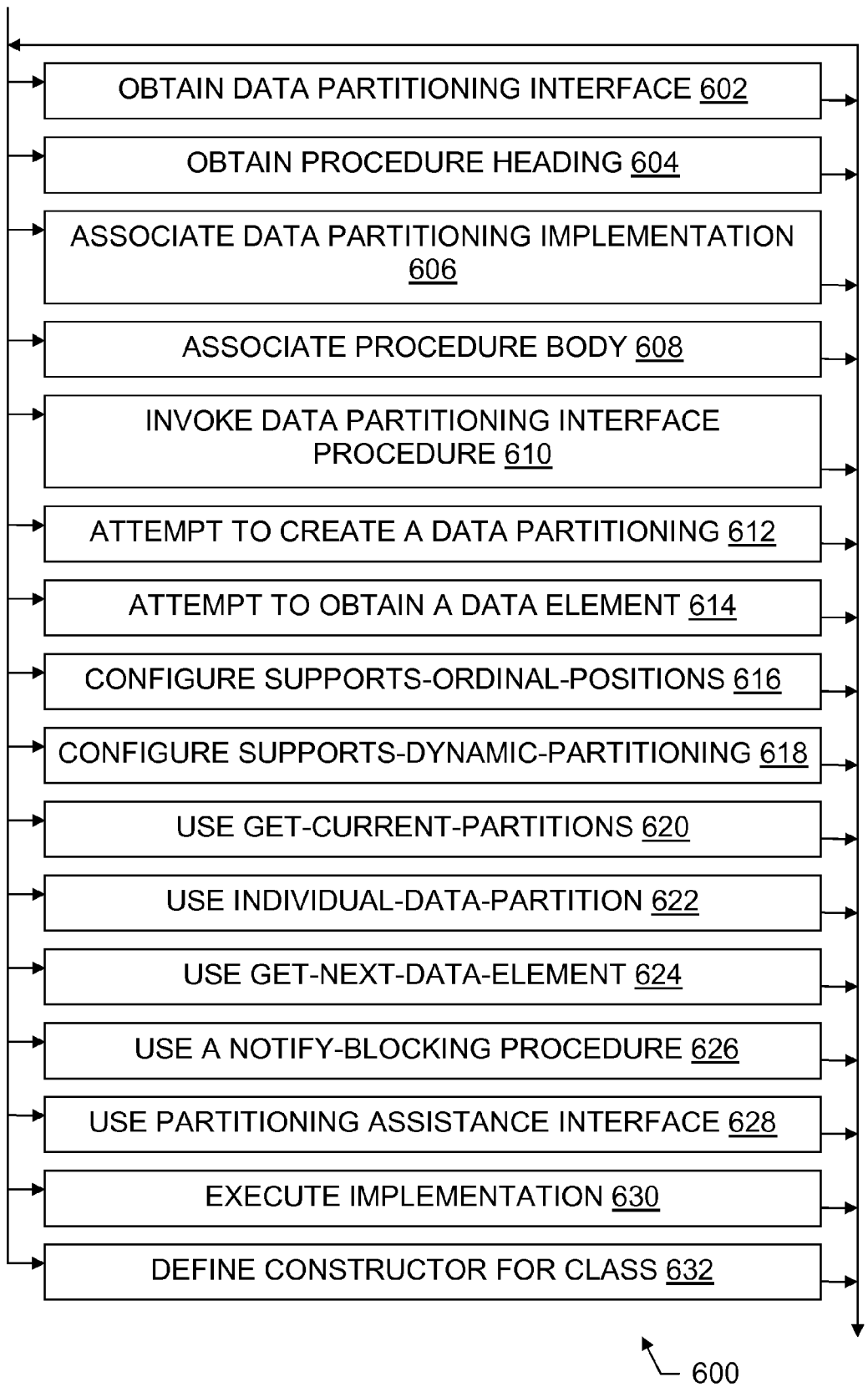
FIG. 6 is a flow chart illustrating steps of some method and configured storage medium embodiments.

FIG. 6 illustrates some method embodiments in a flowchart 600. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 600 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a data partitioning interface obtaining step 602, a software developer (or code acting on behalf of a developer) obtains a data partitioning interface 202. Obtaining step 602 may be accomplished by including a file containing code which implements the data partitioning interface 202, by linking such a file, by loading such a file, or by any mechanism for bringing software capabilities into an environment or into a particular program. A developer is understood to be a particular type of user 104; end-users are also considered users 104.

During a procedure heading obtaining step 604, a developer or an environment obtains a procedure heading 300. Procedure heading obtaining step 604 may coincide with interface obtaining step 602, but it will also be appreciated that by obtaining 602 a data partitioning interface 202 one may in some cases thereby obtain 604 several procedure headings 300.

During a data partitioning implementation associating step 606, a data partitioning implementation 204 is associated with a data partitioning interface 202. Associating step 606 may be accomplished by instantiating a class, by linking, by setting address pointers for routines, or by any other mechanism for associating a procedure body 400 with a procedure heading 300 so that a call to the procedure heading passes control (and in some cases may also pass parameters) to the procedure body.

During a procedure body associating step 608, a procedure body 400 is associated with a procedure heading 300. A given procedure heading 300 may be associated 608 with different procedure bodies 400 at different locations in a system. Procedure body associating step 608 may coincide with implementation associating step 606, but it will also be appreciated that by associating 606 a data partitioning implementation 204 one may in some cases thereby associate 608 several procedure bodies 400.

During a data partitioning interface procedure invoking step 610, a procedure having a procedure heading 300 in a data partitioning interface 202 is invoked. Invoking step 610 may be accomplished using mechanisms that pass control to a routine, and may include passing parameters into the routine.

During a create data partitioning attempting step 612, which may result from an invoking step 610, an attempt is made to create a data partitioning 126. The attempting step 612 may include calling a data partitioning implementation 204 procedure body 400, such as a create-partitioning procedure body 402.

During an obtain data element attempting step 614, which may result from an invoking step 610, an attempt is made to obtain a data element 210. Which element is obtained depends on the implementation and the current contents of the data partitions 208. If a particular element is to be removed, then search criteria may be specified in step 614. The obtain data element attempting step 614 returns the obtained element if one is obtained, and may return a status code. The attempting step 614 may include calling a data partitioning implementation 204 procedure body 400, such as an obtain-data-element procedure body 404.

During a configure supports-ordinal-positions step 616, which may result from an invoking step 610, software is configured to invoke data partitioning implementation instructions which will indicate whether a data partitioning supports access to a data element based on an ordinal position of the data element. The ordinal position may be relative to a given data partition, relative to all data partitions in a data partitioning, relative to a memory address, or relative to some other base. The configuring step 616 may include configuring a call to a data partitioning implementation 204 procedure body 400, such as a supports-ordinal-positions procedure body 410.

During a configure supports-dynamic-partitioning step 618, which may result from an invoking step 610, software is configured to invoke data partitioning implementation instructions which will indicate whether a data partitioning supports dynamic changes, such as the addition of a data partition, or re-assigning data elements to different data partitions on the fly. The configuring step 618 may include configuring a call to a data partitioning implementation 204 procedure body 400, such as a supports-dynamic-partitioning procedure body 412.

During a use get-current-partitions step 620, which may result from an invoking step 610, software is configured to obtain a current data partitioning 126. The using step 620 may include a call to a data partitioning implementation 204 procedure body 400, such as a procedure body in the get-current-partitions implementation 414.

During a use individual-data-partition step 622, which may result from an invoking step 610, software is configured to access a data partition in a data partitioning 126. The using step 622 may include a call to a data partitioning implementation 204 procedure body 400, such as a procedure body in the individual-data-partition implementation 416.

During a use get-next-data-element step 624, which may result from an invoking step 610, software is configured to obtain a data element from a data partition of a data partitioning 126. The using step 624 may include a call to a data partitioning implementation 204 procedure body 400, such as a procedure body in the get-next-data-element implementation 418.

During a use a notify-blocking procedure step 626, which may result from an invoking step 610, software is configured to invoke data partitioning implementation instructions which will aid dynamic partitioning code 120 to claim some or all of any yet-unprocessed elements of the data block represented by a blocked thread 206 and give them to other threads, thereby promoting a load-balanced data partitioning 126. The using step 624 may include a call to a data partitioning implementation 204 procedure body 400, such as one of the notify-blocking procedure bodies 420, 422.

During a use partitioning assistance interface step 628, which may result from an invoking step 610, software may provide code 120, for example, with at least one partitioning assistance value 308 to aid creation (or in some cases, dynamic adjustment) of a data partitioning 126. The using step 628 may include a call to a data partitioning implementation 204 procedure body 400, such as a procedure body in the partitioning assistance implementation 406.

During an executing step 630, instructions 116 in a data partitioning implementation 204 are executed by one or more processors 110.

During a defining step 632, a class constructor is defined using a language which supports classes, such as C-Sharp or Java.

Example Code

Bearing in mind the information provided thus far about systems, methods, and operating environments, program code for an example embodiment is discussed below. Embodiments are not limited to the program code provided here, and a given embodiment may include additional program code, different program code, code written in a different programming language, and/or otherwise depart from the examples provided. Discussion of various embodiments continues after example code, with references back to the example code.

The example includes three new interfaces, using C-Sharp as a programming language:

```
public interface IPartitionableCollection<T> {
    IPartitionedCollection<T> GetInitialPartitions(int p,
bool needsOrdinalPosition);
    bool SupportsTrackingOrdinalPositions { get; }
    bool SupportsDynamicPartitioning { get; }
}
public interface IPartitionedCollection<T> {
    IPartition<T>[ ] CurrentPartitions { get; }
    IPartition<T> AddDynamicPartition( );
    void RemoveDynamicPartition(IPartition<T> p);
}
public interface IPartition<T> {
    bool MoveNext(ref T elem);
```

```
    bool MoveNext(ref T elem, ref int index);
    bool TrackingOrdinalPositions { get; }
}
```

Within an application 122, for example, a data structure implements IPartitionableCollection<T> to indicate that it has a custom partitioning algorithm. The data structure returns an IPartitionedCollection<T> object that represents the result of a partitioning operation; the returned object can be subsequently used to access the resulting partitions. The returned IPartitionedCollection<T> object can also be used to add new dynamic partitions or remove existing partitions if dynamic partitioning is supported, as indicated by Supports-DynamicPartitioning returning true when queried. The implementation could also be in a helper class, i.e. it doesn't have to be implemented by the data structure containing the data. For example, if one had a data structure GroceryShoppingList, then GroceryShoppingList could implement IPartitionableCollection<T>, or a GroceryShoppingListPartitioner could implement IPartitionableCollection<T> and be passed the GroceryShoppingList to partition.

Note that IPartition<T> is much like IEnumerator<T>, and in fact could be one and the same in a reasonable implementation, although this example uses a separate interface to cut down on superfluous interface method calls. For instance, the traditional IEnumerator<T>.MoveNext call followed by Current becomes a single call to IPartition<T>.MoveNext.

In a variation, a GetFirstElement procedure is called to get the first data element of a partition and a GetNextElement procedure is called to get each next data element in turn.

In one example, code calls GetInitialPartitions on a partitionable collection, which provides a partitioned collection, from which code can access all of the current partitions through an array. A variation iterates through a data partitioning using GetFirstPartition and GetNextPartition procedures.

In another variation, base classes are used in place of the public interfaces shown above, with a single virtual method call used in place of one or more interface method calls.

When code 120, such as an engine like PLINQ or TPL, needs to partition such a structure containing parallel data 130, the code 120 calls GetInitialPartitions on an IPartitionableCollection<T>. The call passes as parameters p, the number of partitions desired, and an indication of whether ordinal position should be tracked. The resulting partitioned object contains p partitions in the CurrentPartitions array. Data partitions 208 may be identified by a number, handle, string, or other identifier selected by the data partitioning code.

Many partitioning techniques can trivially support access to an ordinal position, but for those that don't, SupportsTrackingOrdinalPositions will return false (meaning the collection has no notion of ordinal ordering), and an alternative strategy can be used to assign indices. One approach provides a default under which all partitions access the same shared int counter on the IPartitionedCollection<T>:

```
bool MoveNext(ref T elem, ref int index) {
    MyPartitionedCollection<T> mpc = ...;
    if (... has more ...) {
        elem = ... next element ...;
        index = Interlocked.Increment(ref mpc.m__sharedPrivateIndex);
    }
    return false;
}
```

This default would be used if GetInitialPartitions were called with true for needsOrdinalPosition, yet the underlying collection itself returned false for SupportsTrackingOrdinalPositions.

As a simple example of a provider, consider a partitioning provider that works on a List<T>:

```
class PartitionableList<T> :
IParallelPartitionableCollection<T> {
    private IList<T> m__list;
    public PartitionableList<T>(IList<T> list) { m__list = list; }
    public IPartitionedCollection<T> GetInitialPartitions(
            int p, bool needsOrdinalPosition) {
        return new PartitionedList<T>(m__list, p);
    }
    public bool SupportsTrackingOrdinalPositions { get { return true; } }
    public bool SupportsDynamicPartitioning { get { return false; } }
    class PartitionedList : IPartitionedCollection<T> {
        private List<IPartition<T>> m__parts;
        internal PartitionedList(IList<T> list, int p) {
            int stride = list.Count / p;
            m__parts = new List<IPartition<T>>( );
            for (int i = 0; i < p; i++)
                m__parts[i] = new ListPartition<T>(
                    list, stride*i,
Math.Min(stride*(i+1),data.Length);
        }
        public IPartition<T>[ ] CurrentPartitions { get { return m__parts.ToArray( ); } }
        public IPartition<T> AddDynamicPartition( ){throw new NotSupportedException( );}}
    class ListPartition<T> : IPartition<T> {
        private IList<T> m__list;
        private int m__curr;
        private int m__to;
        internal ListPartition(IList<T> list, int from, int to) {
            m__list = list;
            m__curr = from;
            m__to = to;
        }
        public bool MoveNext(ref T elem, ref int index) {
            if (m__curr < m__to) {
                elem = m__list[m__curr];
                index = m__curr;
                m__curr++;
            }
            return true;
        }
        public bool TrackingOrdinalPositions { get { return true; } }
    }
}
```

One may use various out-of-the-box internal providers for common data types: IList<T>, IEnumerable<T>, and arrays, specifically. Other Microsoft .NET Framework providers will perhaps become common data partitioning providers for XML documents, DataSets, and so on. APIs that take other data types may come to use very efficient techniques by default, such as PLINQ's AsParallel, TPL's ForEach, and so on.

In general, it is expected that an invariant among all partitions returned by an initial partition plus any subsequent dynamic additions (via IPartitionedCollection<T>'s AddDynamicPartition) will be that the union of all elements 210 enumerated by all partitions 208 (until MoveNext on them returns false) will be the complete data set held in the underlying collection. Likewise, it is expected that the intersection will be null. This also pertains to dynamic additions and removals, such that adding a new partition dynamically or removing an existing one would not allow two partition enumerators to see the same element. If the original collection contained two identical objects, for the purposes of this partitioning they are considered unique elements.

With regard to dynamic partitioning, consider the example code in connection with a list. The naïve strategy of dividing elements above into p like-sized chunks may work when p is carefully chosen, when the work devoted to processing those p chunks is even, and when there are few external influences on the execution of the code, such as other applications running on the same machine consuming resources. When this isn't the case, load imbalance may become a problem, e.g. some partitions may return false from MoveNext far sooner than other partitions. Therefore, clever implementations may share state in the IPartitionedCollection<T> itself, e.g., between partitions 208, to load balance over iterations.

Moreover, if one finds that the initial size of p was wrong—for example due to a thread 206 blocking after processing a partition—a partitioned collection that supports dynamic additions allows some systems (like PLINQ or TPL) to add a new partition 208. Any suitable synchronization techniques may be used to secure part of the data structure for processing, including the same load balancing mechanisms mentioned above. At a later point, for example once the aforementioned thread unblocks, those additional dynamic partitions could be removed if they were no longer deemed necessary for optimal performance In some embodiments, the dynamic partitioning code 502 includes a thread blocking hint mechanism, including notify-blocking procedure bodies 420, 422 and responsive partitioner code 504 which attempts to prevent the load balance among worker threads 206 from being adversely affected by long durations of blocking in the worker threads.

For example, assume that a specific partitioner code 504 has provided a PFX runtime library in code 120 with four data partitions 208 of almost equal size, denoted P1, P2, P3, P4. Assume PFX has started executing on these partitions using four worker threads 206. Assume also a hypothetical execution profile of the following three phases.

Phase1 is T=0 ms to T=50 ms. Assume there is no blocking, and assume each of the partitions get exactly half way processed, that is, half of the data elements 210 in each partition were processed during Phase1.

Phase2 is T=50 ms to T=100 ms. The first worker thread makes a blocking operating system call (e.g., a file read operation) which will keep that thread blocked for 50 ms. The other three worker threads 206 keep processing as usual. By the end of this phase, partitions P2, P3, and P4 will have been completely processed by the corresponding worker threads.

Phase3 is T=100 ms to T=150 ms. Now that the first worker thread has unblocked (i.e., the file read call returned), the first worker thread keeps processing partition P1. Since processing was halfway done when the first worker thread got blocked, processing will pick up from where it left and therefore take exactly 50 ms to finish partition P1, which in turn marks the completion of processing of the parallel data in this example.

Now consider the CPU utilization profiles in this example. During Phase1, we had 100% utilization on all four logical processors 110, because all worker threads 206 were running. During Phase2, one thread was blocked and three kept running, so the utilization was 75%. During Phase3 only one thread had actual work remaining so the utilization for this last 100 ms period dropped to 25%.

The reason for the imbalance is that the first worker thread 206 held absolute ownership of the partition P1 at times when that thread wasn't able to do any real work, as well as at times when it could have passed on some of the data to the other threads to speed up work. For instance, by dividing the remaining work evenly among the four threads instead of leaving all the work with the first thread, Phase3 could have finished the last of the processing in one-fourth the time, that is, in 12.5 ms instead of 50 ms.

Some embodiments provide a repartitioning mechanism 424 in the partitioner code 504, through which a thread such as the first worker thread in the example above can allow other threads to access the remaining parts of the allowing thread's current partition when the allowing thread goes into blocking. Other worker threads can then grab or be given parts of the allowing thread's partition 208 to process.

In one embodiment, the IPartition interface gets two new methods which the PFX runtime will call when it detects that a worker thread is about to go into blocking and when it gets unblocked. In a variation, the two methods could be rolled into a single method. The method procedure headings 300 could be written as follows:

```
Interface IPartition
{
    ...
    void NotifyBlockingEntry( );
    void NotifyBlockingExit( );
}
```

Corresponding procedure bodies 420, 422 would send a signal, set a flag, or otherwise make known the availability to other threads of data elements presently located in a data partition assigned to the allowing thread, which is about to block. These notifications are handled by the data partitioner code 504, such that the dynamic partitioning logic can claim any yet-unprocessed elements 210 of the data block represented by this IPartition instance, and give them to other threads, potentially as new IPartition objects. This sharing allowance only lasts until a matching NotifyBlockingExit( ) call is made from PFX, after which IPartition.MoveNext( ) will continue to work as usual, except that if any elements 210 of that partition 208 were given away to other threads the original owner this partition (the allowing thread) will never receive those elements from MoveNext( ) after unblocking.

More about embodiments

Discussion of method, system, and configured media embodiments now continues, with references back to the example code.

Some embodiments provide a method which may be used by a software developer to configure partitioning of parallel data 130. The method includes the step 602 of obtaining a data partitioning interface 202, such as IPartitionableCollection<T>, IPartitionedCollection<T>, and IPartition<T> as a group, or else some group of other interface(s) that provide similar functionality. In particular, the method includes obtaining 604 at least one procedure heading 300 for invoking a procedure to create a data partitioning 126 and obtaining 604 at least one procedure heading 300 for invoking a procedure to obtain a data element 210 from a data partition 208 defined by a data partitioning. A "procedure" could be coded as a function or as a void procedure, for example.

The data partitioning 126 has an organizational structure 128 which is left unspecified in the data partitioning interface 202. For example, the organizational structure 128 may call for a list, tree, or other data structure to hold the data elements, and the organizational structure 128 may call for stripes, chunks, ranges, or some other organization of the data elements into partitions. But neither the specific data structure containing the data elements 210 nor the specific approach used to divide elements 210 into partitions need be specified in the data partitioning interface 202.

The method of these embodiments also includes associating 606 with the data partitioning interface 202 a data partitioning implementation 204, such as PartitionableList<T>, PartitionedList, and ListPartition<T>. In particular, the method includes associating 608 at least one procedure body 400 which implements creation of a data partitioning 126 and at least one procedure body 400 which implements obtaining a data element 210 from a data partition 208. The organizational structure of the data partitioning 126, including the data structure that holds the data elements, and the rules or heuristics for dividing data elements between partitions, is specific in the data partitioning implementation 204.

Some methods further include configuring 616 software to invoke data partitioning implementation instructions, such as IPartitionableCollection<T>.SupportsTrackingordinalPosition, to indicate whether a data partitioning 126 supports access to a data element 210 based on an ordinal position of the data element.

Some methods further include configuring 618 software to invoke data partitioning implementation instructions, such as IPartitionableCollection<T>.SupportsDynamicPartitioning, to indicate whether a data partitioning supports dynamic partitioning. Some methods include configuring software such as dynamic partitioning code 502 to invoke data partitioning implementation instructions which perform dynamic partitioning to facilitate load balancing.

Some methods further include configuring software to use 628 a partitioning assistance interface 306 to transmit at least one partitioning assistance value 308 to data partitioning implementation instructions such as partitioner code 504. Some examples of a partitioning assistance value 308 include: processing time vs. number of data elements distributions; preferred partitioning schemes; partitioning schemes to avoid; blocked/unblocked thread status provided through a repartitioning mechanism 424; an enumeration of possible data element processing characteristics (fixed cost per element, {linearly, exponentially}×{increasing, decreasing}, irregular . . . ) without any parameterization; and a parameterized description of the processing characteristics (e.g., "irregular with an upper bound of X and lower bound of Y").

In particular, software in an application 122 or an operating system 124 may be configured to transmit to the data partitioning implementation instructions at least one of the following partitioning assistance values: a processing-time-distribution value indicating how processing time for data elements correlates with the number of data elements, a partitioning-method value identifying a particular partitioning scheme such as range partitioning, stripe partitioning, or chunk partitioning.

Some methods include defining 632 a constructor for a class which implements a specific data partitioning organizational structure, such as ListPartition<T>.

Some embodiments provide a computer system 102 with parallel data 130 organized in heterogeneous partitions (e.g., according to multiple organizational structures 128). The system includes at least one memory 112 configured at least with executable instructions 116, and at least one logical processor 110 configured to execute at least a portion of the instructions for data partitioning; some systems include multiple logical processors.

The system also includes a data partitioning interface 202 which configures the memory and is designed to invoke a procedure to create a data partitioning and to invoke a procedure to obtain a data element from a data partition. The data partitioning 126 has an organizational structure 128 which is unspecified in the data partitioning interface.

Some systems also include a single data partitioning implementation 204. Other systems include two or more data partitioning implementations 204 in memory, each of which is however consistent with and associated with the same data partitioning interface 202. A first data partitioning implementation 204 includes instructions which implement creation of a first data partitioning 126 and instructions which implement obtaining a data element 210 from a data partition 208 of the first data partitioning. The first data partitioning has a first organizational structure 128 which is specific in the first data partitioning implementation. Likewise, a second data partitioning implementation 204 includes instructions which implement creation of a second data partitioning 126 and instructions which implement obtaining a data element 210 from a data partition 208 of the second data partitioning. The second data partitioning has a second organizational structure 128 which is specific in the second data partitioning implementation and which is also different from the first organizational structure. For example, the first organizational structure might be striped while the second is chunked, but both data partitionings are created using the same interface 202.

In some systems, the data partitioning interface 202 includes a supports-ordinal-positions procedure heading 310, such as IPartitionableCollection <T>.SupportsTrackingOrdinal Positions, for invoking data partitioning implementation 204 instructions 116, such as ListPartition<T>.TrackingOrdinalPositions( ), which indicate whether a data partitioning 126 supports access to a data element 210 of a data partition 208 based on an ordinal position of the data element.

In some systems, the data partitioning interface 202 includes a supports-dynamic-partitioning procedure heading 312, such as IPartitionableCollection<T>.SupportsDynamicPartitioning( ), for invoking data partitioning implementation 204 instructions 116, such as PartitionedList.AddDynamicPartition( ), which indicate whether a data partitioning 126 supports dynamic partitioning in the form of adding a data partition 208 to a previously created group of data partitions in a data partitioning 126.

In some systems, the data partitioning interface 202 includes an interface definition for obtaining a current data partitioning, such as a get-current-partitions interface 314 containing a get-current-partitions property, as for example IPartitionedCollection.CurrentPartitions[ ]. An "interface definition" could be, for example, a C-Sharp public interface or class with public properties, or it could be a similar construct in another programming language.

In some systems, the data partitioning interface 202 includes an interface definition for obtaining a current data partitioning, such as a get-current-partitions interface 316 containing an individual-data-partition property, as for example IPartition<T>.

In some systems, the data partitioning interface 202 includes an interface definition for obtaining a current data partitioning, such as a get-next-data-element interface 318 containing a get-next-data-element property, as for example one of the IPartition<T>.MoveNext( ) methods.

Configured Media

Some embodiments provide a storage medium configured with computer data and computer instructions, such as data 118 and instructions 116, for performing a method of providing blocking-bounding semantics as discussed above. The storage medium which is configured may be a memory 112, for example, and in particular may be a removable storage medium 114 such as a CD, DVD, or flash memory.

Some embodiments provide a storage medium 114 configured with computer data and computer instructions for partitioning data, the method including associating 606 a data partitioning implementation with a data partitioning interface, the data partitioning implementation designed to implement creation of a data partitioning and to implement obtaining a data element from a data partition of the data partitioning, the data partitioning having an organizational structure that is specific in the data partitioning implementation and unspecified in the data partitioning interface; and executing 630 instructions of the data partitioning implementation for creating a data partitioning.

In some embodiments, the method includes executing 630 instructions of the data partitioning implementation to create a first data partitioning from a collection of data elements while running an application program a first time, and executing instructions of the data partitioning implementation to create a second data partitioning from the collection of data elements while running the application program a second time. The two data partitionings differ in that at least one of the data elements is assigned to a different data partition in the first data partitioning than in the second data partitioning. That is, the same data can be partitioned differently on different execution runs.

In some embodiments, the step of executing instructions of the data partitioning implementation for creating a data partitioning assigns data elements to data partitions. If the number of data elements assigned to a given data partition subsequently drops to a predetermined threshold, the computer instructions assign at least one other data element to the given data partition. That is, in some embodiments dynamic partitioning code 502 operates to help partitions 208 load balance internally amongst themselves. In particular, if the predetermined threshold is zero, then MoveNext( ) will fail, and internal load balancing will then move data elements 210 into the empty partition 208.

In some embodiments, the step of executing instructions of the data partitioning implementation for creating a data partitioning assigns data elements to data partitions, and processing begins. In particular, a data element 210 is obtained from a partition 208. Subsequently, an additional data partition 208 is created and is assigned data elements 210. That is, a new partition 208 is created and populated after previously created partitions 208 are already in use.

More generally, there are at least two kinds of dynamic partitioning: (a) moving data elements among existing partitions, and (b) creating new partitions and moving data elements into them. Some embodiments perform type (a) dynamic partitioning, as when a data element is re-assigned from one data partition to another data partition. A pool of data elements not yet assigned to threads is nonetheless a data partition 208. Some embodiments perform type (b) dynamic partitioning, and some perform both types of dynamic partitioning.

In some embodiments, the method includes executing instructions of the data partitioning implementation to receive at least one partitioning assistance value 308 for data partitioning. For example, a PFX library in code 120 could give an application 122 one or more hints that may be used when partitioning the data 130, or the application 122 could give hint values 308 to the code 120, depending on where the partitioner code 504 resides.

In some embodiments, the method includes executing instructions, such as notify-blocking procedure bodies 420, 422 or some other code implementing a repartitioning mechanism 424, by which an allowing thread 206 can grant other threads permission to process data elements 210 that were previously assigned to the allowing thread. In some embodiments, thread blocking hints will be targeted to the data partitioning interface (e.g., IPartition), rather than the partitioner interface (e.g., IPartitionableCollection), or at the very least blocking hints are associated with a specific data partition instance. In some embodiments, hint values 308 are provided for configuring a specific partitioner interface, e.g., so that a shared library chunk partitioner can work nicely with, say, monotone increasing distributions.

More generally, any of the method steps illustrated in FIG. 6, or otherwise taught herein, may be used to help configure a storage medium to thereby form a configured medium embodiment.

CONCLUSION

As described herein, some embodiments provide various tools and techniques to facilitate partitioning of data for parallel processing.

Although particular embodiments are expressly illustrated and described herein as methods, configured media, or systems, it will be appreciated that discussion of one type of embodiment also generally extends to other embodiment types. For instance, the descriptions of methods in connection with FIG. 6 also help describe configured media, as well as the operation of systems like those described in connection with FIGS. 1 though 5. It does not follow that limitations from one embodiment are necessarily read into another. In particular, methods are not necessarily limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method which may be used by a software developer to configure partitioning of parallel data for parallel processing, the method comprising the steps of:

obtaining a data partitioning interface, namely, obtaining at least one procedure heading for invoking a procedure to create a data partitioning and obtaining at least one procedure heading for invoking a procedure to obtain a data element from a data partition, the data partitioning having an organizational structure which is unspecified in the data partitioning interface and in particular the data partitioning interface being free of an organizational structure which specifies data element partitions based on whether data elements are replicated and also being free of an organizational structure which specifies data element partitions based on where data elements are replicated; and associating a data partitioning implementation with the data partitioning interface, namely, associating at least one procedure body which implements creation of a data partitioning and at least one procedure body which implements obtaining a data element from a data partition for parallel processing with at least one other parallel data element, the organizational structure of the data partitioning being specific in the data partitioning implementation.

2. The method of claim 1, further comprising configuring software to invoke data partitioning implementation instructions which indicate whether a data partitioning supports access to a data element based on an ordinal position of the data element.

3. The method of claim 1, further comprising configuring software to invoke data partitioning implementation instructions which indicate whether a data partitioning supports dynamic partitioning.

4. The method of claim 1, further comprising configuring software to invoke data partitioning implementation instructions which perform dynamic partitioning to facilitate load balancing.

5. The method of claim 1, further comprising configuring software to transmit at least one partitioning assistance value to data partitioning implementation instructions.

6. The method of claim 5, wherein the software is configured to transmit to the data partitioning implementation instructions at least one of the following partitioning assistance values: a processing-time-distribution value indicating how processing time for data elements correlates with the number of data elements, a partitioning-method value identifying a particular partitioning scheme.

7. The method of claim 1, wherein the method comprises defining a constructor for a class which implements a specific data partitioning organizational structure.

8. A computer system with parallel data for parallel processing in heterogeneous partitions defined by data partitioning algorithm implementations, the system comprising:

at least one memory configured with executable instructions; at least one logical processor configured to execute at least a portion of the instructions for data partitioning;

a data partitioning interface which configures the memory and is designed to invoke a procedure to create a data partitioning and to invoke a procedure to obtain a data element from a data partition, the data partitioning having an organizational structure which is unspecified in the data partitioning interface and in particular the data partitioning interface being free of an organizational structure which specifies data element partitions based on whether data elements are replicated and also being free of an organizational structure which specifies data element partitions based on where data elements are replicated;

a first data partitioning implementation which configures the memory and is associated with the data partitioning interface, namely, instructions which implement creation of a first data partitioning and instructions which implement obtaining a data element from a data partition of the first data partitioning for parallel processing with at least one other parallel data element, the first data partitioning having a first organizational structure which is specific in the first data partitioning implementation; and a second data partitioning implementation which configures the memory and is associated with the data partitioning interface, namely, instructions which implement creation of a second data partitioning and instructions which implement obtaining a data element from a data partition of the second data partitioning for parallel processing with at least one other parallel data element, the second pluggable custom data partitioning having a second organizational structure which is specific in the second data partitioning implementation and different from the first organizational structure.

9. The system of claim 8, wherein the data partitioning interface comprises a supports-ordinal-positions procedure heading for invoking data partitioning implementation instructions which indicate whether a data partitioning supports access to a data element of a data partition based on an ordinal position of the data element.

10. The system of claim 8, wherein the data partitioning interface comprises a supports-dynamic-partitioning procedure heading for invoking data partitioning implementation instructions which indicate whether a data partitioning supports at least one of the following: adding a data partition to a previously created group of data partitions in a data partitioning, removing a data partition from a previously created group of data partitions in a data partitioning.

11. The system of claim 8, wherein the system comprises multiple logical processors.

12. The system of claim 8, wherein the system comprises memory configured by an interface definition which provides a get-current-partitions property for obtaining a current data partitioning.

13. The system of claim 8, wherein the system comprises memory configured by an interface definition which provides an individual-data-partition property for accessing a data partition in a data partitioning.

14. The system of claim 8, wherein the system comprises memory configured by an interface definition which provides a get-next-data-element property for obtaining a data element from a data partition of a data partitioning.

15. A storage medium configured with computer data and computer instructions for partitioning parallel data for parallel processing in partitions defined by a pluggable custom data partitioning algorithm implementation, the method comprising the steps of:

associating a pluggable custom data partitioning implementation with a data partitioning interface, the pluggable custom data partitioning implementation designed to implement creation of a pluggable custom data partitioning and to implement obtaining a data element from a pluggable custom data partition of the pluggable custom data partitioning for parallel processing, the pluggable custom data partitioning having an organizational structure that is specific in the pluggable custom data partitioning implementation and unspecified in the data partitioning interface and in particular the data partitioning interface being free of an organizational structure which specifies data element partitions based on whether data elements are replicated and also being free of an organizational structure which specifies data element partitions based on where data elements are replicated; and executing instructions of the pluggable custom data partitioning implementation for creating a pluggable custom data partitioning of parallel data for parallel processing.

16. The configured medium of claim 15, wherein the method comprises executing instructions of the pluggable custom data partitioning implementation to create a first pluggable custom data partitioning from a collection of data elements while running an application program a first time, and executing instructions of the pluggable custom data partitioning implementation to create a second pluggable custom data partitioning from the collection of data elements while running the application program a second time, and wherein the data partitionings differ in that at least one of the data elements is assigned to a different data partition in the first data partitioning than in the second data partitioning.

17. The configured storage medium of claim 15, wherein the step of executing instructions of the data partitioning implementation for creating a data partitioning assigns data elements to data partitions, wherein the number of data elements assigned to a given data partition drops to a predetermined threshold, and in response to the drop the computer instructions assign at least one other data element to the given data partition.

18. The configured storage medium of claim 15, wherein the step of executing instructions of the data partitioning implementation for creating a data partitioning assigns data elements to data partitions, and wherein an additional data partition is created and is assigned data elements after data elements have been already been assigned to and obtained from at least one other data partition.

19. The configured medium of claim 15, wherein the method comprises executing instructions of the data partitioning implementation to receive at least one partitioning assistance value for data partitioning.

20. The configured medium of claim 15, wherein the method comprises executing instructions by which an allowing thread can grant other threads permission to process data elements that were previously assigned to the allowing thread.

* * * * *